United States Patent
Hong

(10) Patent No.: US 7,321,764 B2
(45) Date of Patent: Jan. 22, 2008

(54) METHOD FOR PROCESSING CALL IN MOBILE COMMUNICATION TERMINAL SUPPORTING MULTI-MODE TELECOMMUNICATION SYSTEM

(75) Inventor: Hui-Jin Hong, Seoul (KR)

(73) Assignee: Pantech & Curitel Communications, Inc., Seoul (KR)

(*) Notice: Subject to any disclaimer, the term of this patent is extended or adjusted under 35 U.S.C. 154(b) by 34 days.

(21) Appl. No.: 11/116,261

(22) Filed: Apr. 28, 2005

(65) Prior Publication Data

US 2005/0260980 A1    Nov. 24, 2005

(30) Foreign Application Priority Data

May 18, 2004  (KR)  .................. 10-2004-0035371

(51) Int. Cl.
*H04M 3/00* (2006.01)

(52) U.S. Cl. .................. 455/419; 455/436; 455/437; 455/438; 455/439; 455/442; 455/443; 455/444; 455/450; 455/550.1; 455/552.1; 455/553.1; 370/329; 370/331

(58) Field of Classification Search ........ 455/436–444, 455/450–452.1, 550.1, 552.1, 553.1, 419; 370/329, 331–334

See application file for complete search history.

(56) References Cited

U.S. PATENT DOCUMENTS

| | | | | |
|---|---|---|---|---|
| 4,775,999 A | * | 10/1988 | Williams .................. | 455/435.1 |
| 6,064,889 A | * | 5/2000 | Fehnel ....................... | 455/511 |
| 6,768,728 B1 | * | 7/2004 | Kim et al. .................. | 370/342 |
| 2004/0097224 A1 | * | 5/2004 | Lim ........................... | 455/425 |
| 2004/0110512 A1 | * | 6/2004 | Lim ........................... | 455/450 |
| 2004/0180660 A1 | * | 9/2004 | Choi et al. .................. | 455/436 |
| 2004/0184419 A1 | * | 9/2004 | Park ........................... | 370/328 |

* cited by examiner

*Primary Examiner*—Steve M. D'Agosta
(74) *Attorney, Agent, or Firm*—Oblon, Spivak, McClelland, Maier & Neustadt, P.C.

(57) ABSTRACT

Disclosed is a method for processing a call in a mobile communication terminal supporting a multi-mode telecommunication system, wherein it is checked whether or not the mobile communication terminal is in a conversation state upon receiving a call release order message, and a call release process is carried out if the mobile communication terminal is in the conversation state.

5 Claims, 4 Drawing Sheets

METHOD FOR PROCESSING CALL IN MOBILE COMMUNICATION TERMINAL SUPPORTING MULTI-MODE TELECOMMUNICATION SYSTEM

BACKGROUND OF THE INVENTION

This application claims priority to Korean Patent Application No. 2004-35371, filed on May 18, 2004, in the Korean Intellectual Property Office, the entire contents of which are hereby incorporated by reference.

1. Field of the Invention

The present invention relates to a method for processing a call in a mobile communication terminal supporting a multi-mode telecommunication system and, more particularly, to a method for processing a call when the mobile communication terminal receives a call release order in a specific mode.

2. Description of Related Art

A tri-mode communication system enables an automatic switching operation among three systems, i.e., Personal Communication Service (PCS), Code Division Multiple Access (CDMA), and Advanced Mobile Phone Service (AMPS), and provides seamless communications in a region where these systems coexist. The term "multi-mode", or "multi-mode telecommunication system" as used in this specification refers to a complex system supporting a plurality of different mobile communication systems.

A mobile communication terminal supporting the tri-mode usually enters into a system determination state when it receives a call release order from the AMPS system. That gives the terminal a chance to scan the systems through a system reselection process and to select the CDMA system since the CDMA system is more advantageous than the AMPS system in most cases.

The mobile communication terminal supporting the tri-mode is equipped with a system determination algorithm for controlling a switching operation among these systems. For example, Qualcomm's MSM 6000 series chipsets are provided with an SD 2.0 algorithm. The SD 2.0 algorithm supports script resources provided in the form of an object to be independently called and used as needed. When a mobile communication terminal using the SD 2.0 algorithm receives a call release order while operating in the AMPS system, it enters into an analog idle state by way of an analog init state, and exits into the system determination state if a 4 sec timer expires. A chance to switch to an optimum system is obtained by scanning multiple systems in the system determination state.

Meanwhile, a typical AMPS system utilizes a call setup process as shown in FIG. 3. First, when a base station transmits a page order to a mobile station (step S201), the mobile station transmits a page response message in response to the page order and waits for the base station to designate a voice channel (step S203). Subsequently, when the mobile station receives a voice channel designate message from the base station, it tunes itself to a designated channel (step S205). Next, the base station transmits an 'Alert With Info' message, and the mobile station rings a bell upon receipt of the message (step S207). When a user pushes keys, the mobile station transmits a connect order to the base station (step S209), and then a conversation state is established (step S211).

However, another AMPS system in a specific region has a call processing process different from the above-mentioned AMPS system. FIG. 4 shows another call setup process of the AMPS system utilized in such a region. First, a base station transmits a page order to a mobile station (step S301). The mobile station transmits a page response message in response to the page order, and waits for the base station to designate a voice channel (step S303). Unlike the case of FIG. 3, the base station does not transmit a voice channel designate message but instead transmits a release order requesting a call release (step S305). Subsequently, the base station transmits the page order once again to the mobile station a few seconds later (step S201), and the above-mentioned process shown in FIG. 3 follows. What the base station issues a call release order with respect to the first page response message of the mobile station seems to be part of a call re-establishment process in the AMPS system.

In such a region, a mobile station equipped with Qualcomm's SD 2.0 algorithm may have a serious problem as follows. That is, in the step S201 where the base station transmits the page order for a call setup for the second time after the step S305 where the release order is received, the mobile station may recognize the received release order as an instruction to perform a call release and enter into a system re-determination state. Since the call release order is made during the call setup process in such a region, the mobile station equipped with the SD 2.0 algorithm may fail to perform the call setup at this time. That is, it may be not possible for the mobile station to receive a call in such a region.

SUMMARY OF THE INVENTION

The present invention provides a method and a multi-mode mobile communication terminal capable of stably receiving a call in AMPS systems.

In accordance with an aspect of the present invention, there is provided a method of processing a call in a mobile communication terminal supporting a multi-mode telecommunication system, wherein it is checked whether or not the mobile communication terminal is in a conversation state upon receiving a call release order message, and a call release process is carried out if the mobile communication terminal is in the conversation state.

The method may comprise the steps of: a) receiving the call release order message; b) checking a reselection flag; and c) performing the call release process if the reselection flag is set to a first value corresponding to the conversation state.

The method may further comprise the step of setting the reselection flag to the first value if the mobile communication terminal is currently in the conversation state between the steps a) and b).

The method may further comprise the step of entering into an idle state if the reselection flag is set to a second value after the step b).

The step c) may comprise the step of setting the reselection flag to the second value and performing the call release process if the reselection flag is set to the first value corresponding to the conversation state.

In accordance with another aspect of the present invention, there is provided a mobile communication terminal supporting a multi-mode telecommunication system, which checks whether or not to be in a conversation state upon receiving a call release order message, and performs a call release process if it is determined to be in the conversation state.

The mobile communication terminal may comprise: a memory for storing a reselection flag; a RF (radio frequency) module for communicating with a base station over control and voice channels; and a controller for checking the reselection flag stored in the memory upon receiving the call release order message through the RF module, and performing the call release process with respect to the voice channel of the RF module if the reselection flag is set to a first value corresponding to the conversation state.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE INVENTION

Exemplary embodiments of the present invention will now be described below in more detail with reference to the accompanying drawings. Like numerals refer to like elements throughout the specification.

Figure 1:
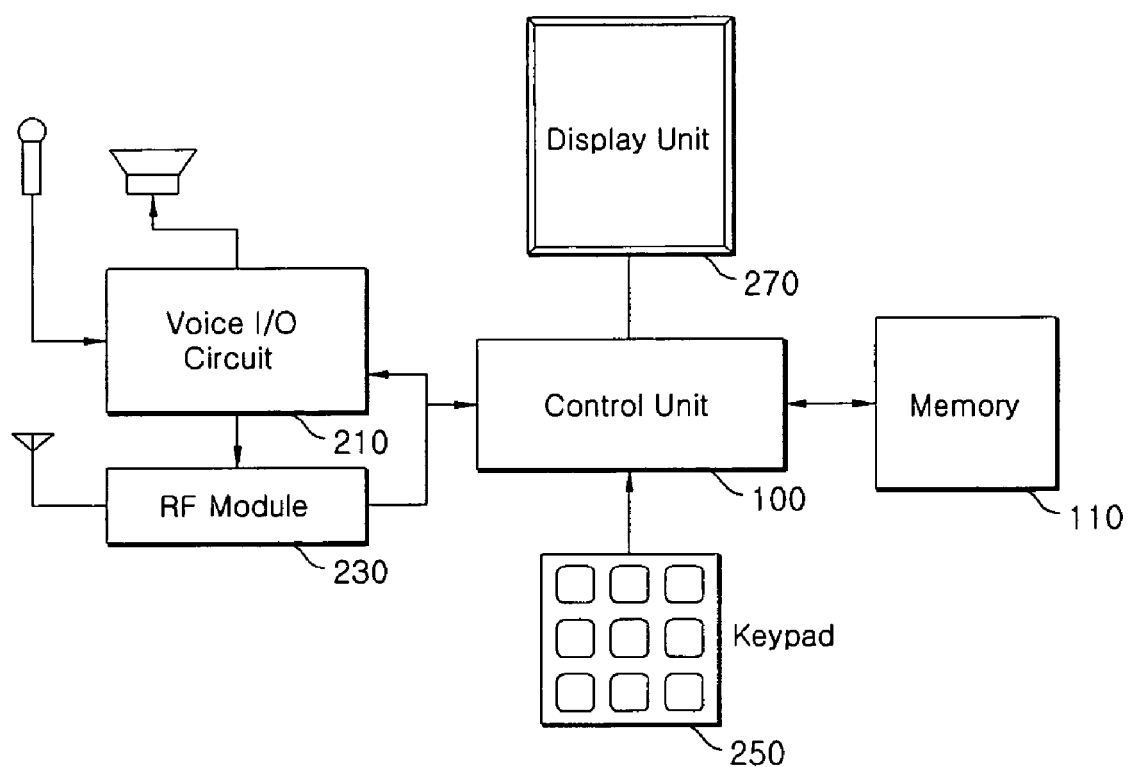
FIG. 1 is a schematic block diagram showing the construction of a multi-mode mobile communication terminal in accordance with an embodiment of the present invention.

FIG. 1 is a schematic block diagram showing the construction of a multi-mode mobile communication terminal in accordance with an embodiment of the present invention. The mobile communication terminal includes a controller 100, a radio frequency (RF) module 230 for extracting voice and data signals from a radio signal transmitted/received through an antenna, a voice input/output (I/O) circuit 210 for inputting and outputting a voice communication signal transmitted from the RF module using a microphone and a speaker, a keypad 250 acting as an accessory circuit, and a display unit 270 for displaying a menu and an operation state.

The keypad 250 may consist of a variety of input means including a key button. The display unit 270 can be any known display device such as an LCD device, for example. Also, the RF module 230 is constructed of an antenna and an RF circuit used to communicate with the base station and the like. In the case of the multi-mode mobile communication terminal, the RF module 230 may be configured to cover different frequency bands assigned to each of the communication systems. The RF module 230 communicates with the base station through a control channel and a voice channel. The voice I/O circuit 210 is a well-known component, which converts digital voice data into an analog voice signal or vice versa and includes an additional circuit such as an audio amplifier or a filter.

The controller 100 controls the overall system by accessing a memory 110 for storing a main program and temporary data. When the controller 100 receives a call release order message, it checks whether or not the terminal is in the conversation state. The controller 100 carries out a call release process if the terminal is in the conversation state. The memory 110 can store a reselection flag. In accordance with an embodiment of the present invention, when the controller 100 receives a call release order message through the RF module 230, it checks the reselection flag stored in the memory 110. The controller 100 carries out a call release process with respect to a voice channel of the RF module 230 if the flag is a first value corresponding to a conversation state.

Figure 2:
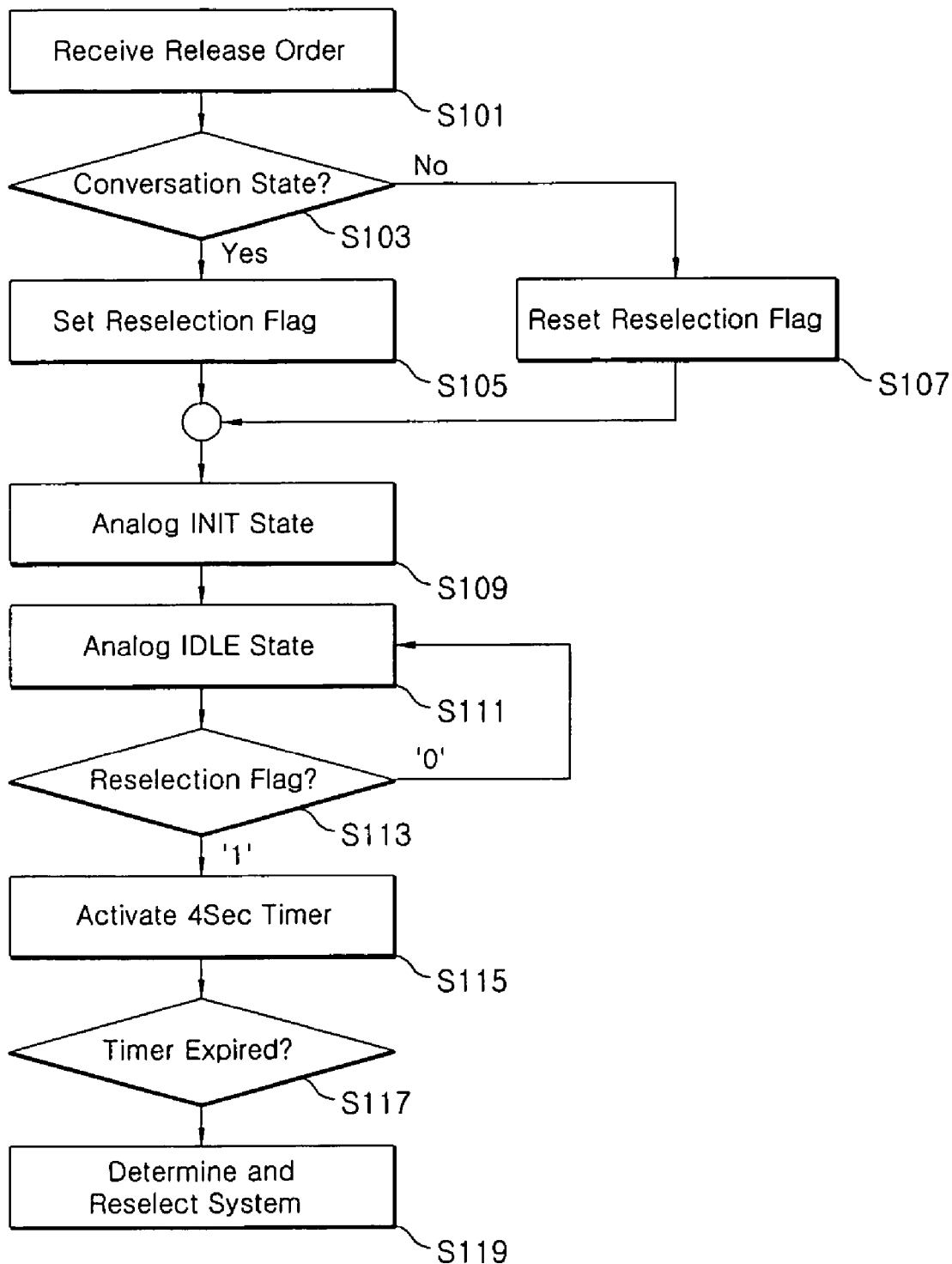
FIG. 2 is a schematic flowchart showing a method for processing a call in accordance with an embodiment of the present invention.
Figure 3:
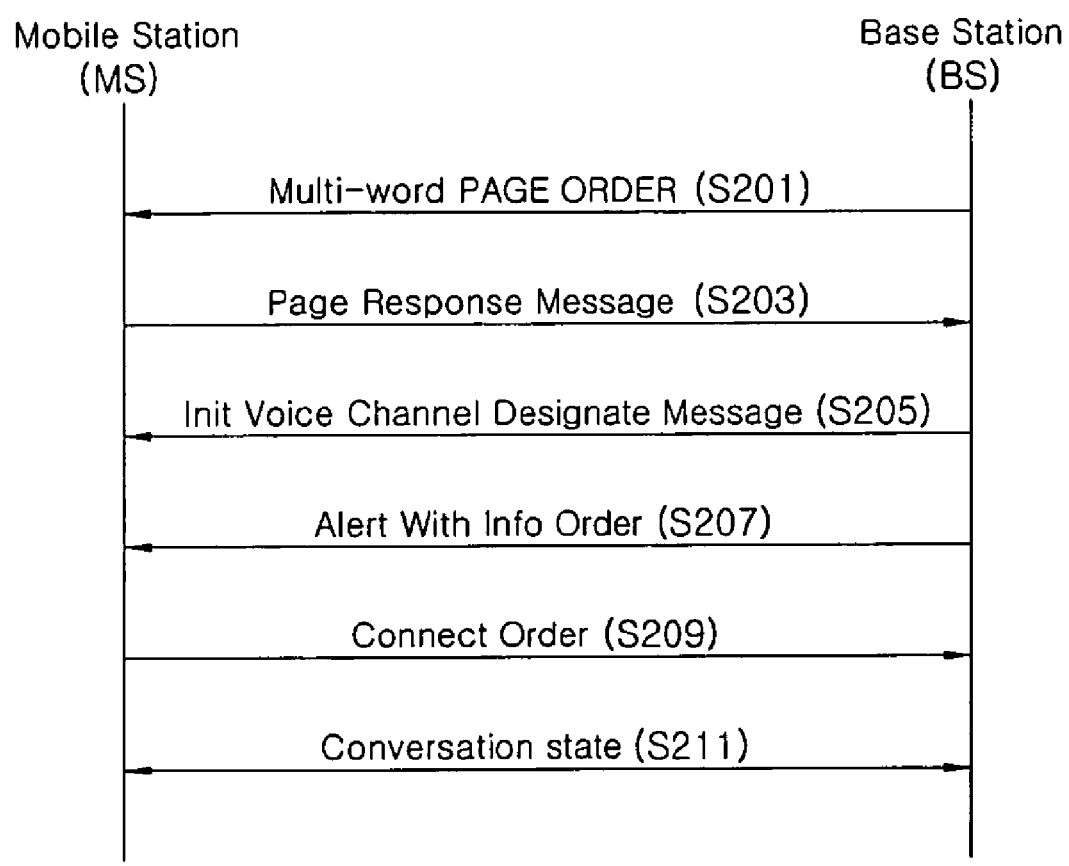
FIG. 3 is a view showing a call setup process of a typical AMPS system.
Figure 4:
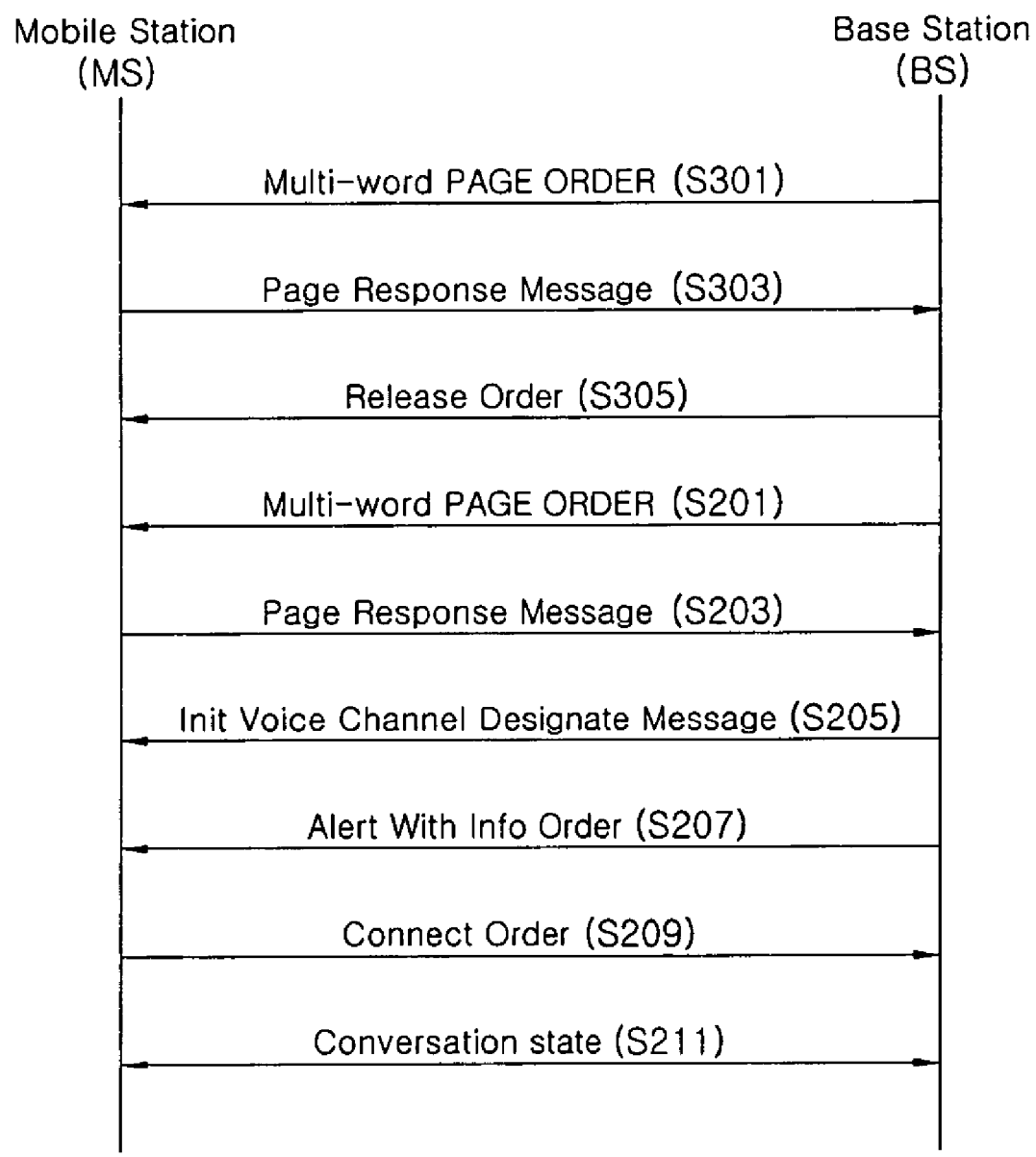
FIG. 4 is a view showing another call setup process of an AMPS system utilized in a specific region.

FIG. 2 is a schematic flowchart showing a method for processing a call in accordance with an embodiment of the present invention. In accordance with the method of the present invention, when a call release order message is received, it is checked whether or not the terminal is in a conversation state. In the case of the conversation state, a call release process is carried out. It may be checked whether or not a terminal is in a conversation state by checking a conversation state immediately after receiving the call release order message (step S103 in FIG. 2) and/or checking a reselection flag that is set after the step S209 or S211 where a communication line is connected in FIG. 3 or FIG. 4.

In accordance with an embodiment of the present invention, the method for processing a call in the multi-mode mobile communication terminal includes the steps of receiving a call release order message (step S101), checking a reselection flag (step S113), and performing a call release process if the reselection flag is a first value corresponding to a conversation state, e.g., a 'TRUE' value ('1') (step S115 and beyond). The reselection flag is one of flags used for recording the state of the mobile communication terminal.

In accordance with another embodiment of the present invention, the method for processing a call in the multi-mode mobile communication terminal further includes the steps of receiving 'Release Order' which is a call release order message and checking whether or not the terminal is currently in a conversation state (step S103), and setting a reselection flag as a first value, e.g., a TRUE value ('1') if the terminal is in the conversation state (step S105), or setting the reselection flag as a second value, e.g., a 'FALSE' value ('0') if the terminal is not in the conversation state (step S107). It is determined whether or not the communication terminal is in the conversation station by checking whether or not a communication channel is active. However, the reselection flag does not necessarily need to be set after receiving the call release order message. Alternatively, in accordance with another embodiment of the present invention, the reselection flag may be set when a communication line is connected. For example, in the call setup process shown in FIG. 3 or 4, the terminal can set the reselection flag to the TRUE value immediately after the step S209 where it receives 'Connect Order' or the step S211 where it enters into the conversation state. That is, since the reselection flag is set to discriminate whether the call release order is transmitted or received after a voice communication has been commenced, or when the call setup process is in progress, the time for setting the reselection flag can vary.

In one embodiment of the present invention, an analog INIT state process (step S109) and an analog IDLE state process (step S111), which are carried out in a general call release process, are sequentially performed between the reselection flag setup process (steps S105 and S107) and the reselection flag check process (step S113).

If the reselection flag is determined to be FALSE, the terminal enters into a standby state. That is, the reselection flag set to 'FALSE' implies that the received call release order has occurred during the communication line setup process in a specific region. As a result, the terminal remains in the analog IDLE state to receive the second page order message in the step S201 in FIG. 4.

When the reselection flag is determined to be TRUE in the step S113, the call release process is carried out. At this time, the 4 sec timer is activated in the same manner as described above (step S115). When the timer expires, the terminal enters into the system determination state and scans the multiple systems to reselect one of them. A default value of the reselection flag is FALSE ('0'). If the reselection flag is set to the TRUE value, the reselection flag is to be returned to the default value, i.e., FALSE ('0') before the call release process is carried out.

As described above in detail, since the mobile communication terminal supporting a multi-mode telecommunication system in accordance with the present invention selectively enters into a call release state or an idle state according to whether or not the terminal is in a conversation state when it receives a call release order, it is possible to make a call setup in an AMPS system located in a specific region.

While the present invention has been described with reference to exemplary embodiments thereof, it will be understood by those skilled in the art that various changes in form and details may be made therein without departing from the scope of the present invention as defined by the following claims.

What is claimed is:

1. A method of processing a call in a mobile communication terminal supporting a multi-mode telecommunication system, comprising:
    a) receiving a call release order message;
    b) checking whether or not the mobile communication terminal is in a conversation state upon receiving the call release order message;
    c) checking a reselection flag; and
    d) performing a call release process if the reselection flag is set to a first value corresponding to the mobile communication terminal being in the conversation state;
    wherein the performing d) comprises:
    setting the reselection flag to a second value and performing the call release process if the reselection flag is set to the first value corresponding to the conversation state.

2. A mobile communication terminal, supporting a multi-mode telecommunication system, which checks whether or not to be in a conversation state upon receiving a call release order message, and performs a call release process if it is determined to be in the conversation state, comprising:

a memory for storing a reselection flag;
    a RF (radio frequency) module for communicating with a base station over control and voice channels; and
    a controller for checking the reselection flag stored in the memory upon receiving the call release order message through the RF module, and performing the call release process with respect to the voice channel of the RF module if the reselection flag is set to a first value corresponding to the conversation state;
    wherein the controller sets the reselection flag to a second value and performs the call release process if the reselection flag is set to the first value corresponding to the conversation state.

3. A method of processing a call in a mobile communication terminal supporting a multi-mode telecommunication system, comprising:
    a) receiving a call release order message;
    b) checking whether or not the mobile communication terminal is in a conversation state upon receiving the call release order message;
    c) checking a reselection flag; and
    d) performing a call release process if the reselection flag is set to a first value corresponding to the mobile communication terminal being in the conversation state, wherein the performing d) comprises:
    setting the reselection flag to a second value and performing the call release process if the reselection flag is set to the first value corresponding to the conversation state.

4. The method of claim 3, further comprising:
    e) setting the reselection flag to the first value if the mobile communication terminal is currently in the conversation state between the receiving a) and the checking c).

5. The method of claim 3, further comprising:
    e) entering into an idle state if the reselection flag is set to a second value after the checking c).

* * * * *